Nov. 8, 1966    E. H. LAND    3,283,683
SELF-DEVELOPING CAMERA

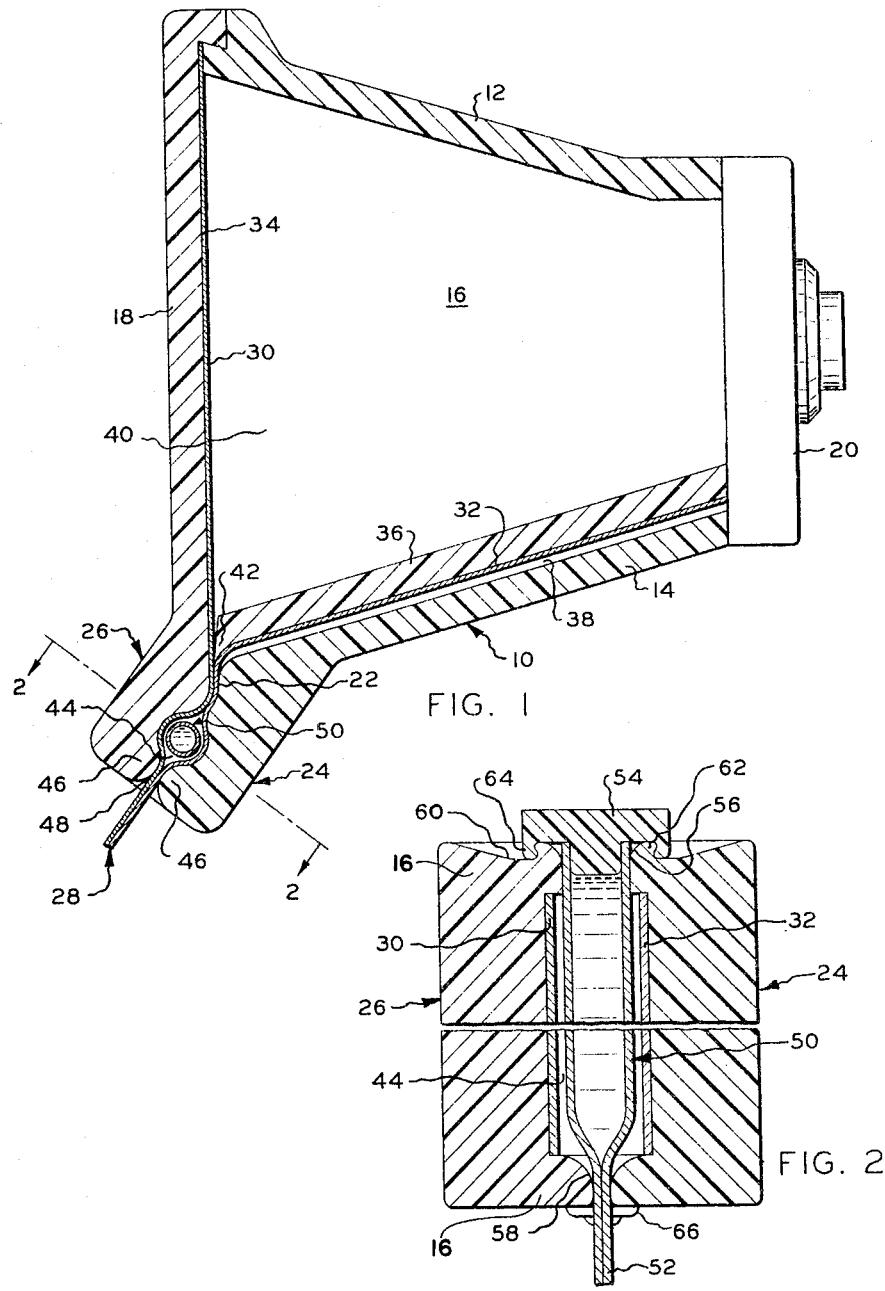

Filed Aug. 24, 1964    2 Sheets-Sheet 2

INVENTOR.
Edwin H. Land
BY Brown and Mikulka
Robert E. Corb
ATTORNEYS

United States Patent Office 3,283,683
Patented Nov. 8, 1966

3,283,683
SELF-DEVELOPING CAMERA
Edwin H. Land, Cambridge, Mass., assignor to Polaroid Corporation, Cambridge, Mass., a corporation of Delaware
Filed Aug. 24, 1964, Ser. No. 391,705
7 Claims. (Cl. 95—13)

This invention relates to photographic apparatus and, more particularly, to novel apparatus for exposing and processing photosensitive materials to produce useful photographic images.

This application is a continuation-in-part of my copending application Serial No. 116,640, filed May 19, 1961, which in turn is a division of application Serial No. 624,787, filed Nov. 28, 1956, now abandoned.

In conventional photographic processes, the speed of the photosensitive material is considered fixed and because processing is standardized, the speed of the overall process for producing a useful print is also fixed for all practical purposes. The exposure conditions, that is, those factors including the intensity of illumination and the reflectivity of the subject characterized as brightness and, more correctly, luminance, which control the light reaching the exposure means, may vary between exposures or may not be subject to control, so that proper exposure, that is, exposure which is appropriate to the speed of the photosensitive material for producing a useful image of predetermined contrast, must be controlled. In conventional photographic practice this control over exposure is usually effected by varying the duration of exposure and/or the exposure stop employed.

The aforementioned application describes a method of producing photographic prints wherein the effective speed of the photosensitive material may be adjusted to suit the brightness or luminance conditions of the subject photographed at the time the exposure was made; and a method of producing a plurality of useful positive photographic prints employing negative materials having substantially the same ASA rated speed, and wherein the exposures for producing said prints are substantially different and the equivalent overall speed of the process for producing each print is controlled in accordance with the exposure by a proper selection of the fluid composition employed to produce the print. This process involves spreading a fluid processing composition in a layer between an exposed photosensitive silver halide emulsion and an image-receiving layer superposed therewith, and is performed with photographic apparatus in the form of a camera including means for making a plurality of substantially different exposures of equal duration with the same exposure stop, and permitting a container of the fluid composition, selected to give an overall speed for which each exposure is proper, to be supplied for spreading between the exposed photosensitive emulsion and an image-receiving layer.

Cameras of this general type usually include means for storing a photosensitive sheet and a second sheet, exposing the photosensitive sheet, superposing the exposed photosensitive sheet with the second sheet and distributing a fluid processing composition between the superposed sheets. It is the usual practice to provide the fluid composition in a rupturable container associated with one of the sheets and to move the container and superposed sheets between a pair of pressure-applying members for causing the fluid contents of the container to be discharged therefrom and spread in a layer between the sheets. In my U.S. Patent No. 3,047,387, issued July 31, 1962, there is disclosed a method of photography together with photographic products useful therein, wherein a container carrying a fluid composition is withdrawn from association with the sheets and its fluid contents are discharged in a mass on one of the sheets as the container is withdrawn prior to movement of the sheets between a pair of pressure-applying members for spreading the fluid in a layer between the superposed sheets. Containers of this type are generally elongated and each is positioned transversely of the sheets so that its fluid contents are discharged in an elongated mass transversely of the sheets as the container is withdrawn in the direction of its elongation. The container is not associated with the sheets at the time the sheets are loaded into the camera but is introduced into the camera and located in position for withdrawal therefrom following exposure.

An object of the invention is to provide a camera of the type described including a lens and shutter assembly having a fixed speed and aperture, and means for measuring the luminance conditions of the subject at the time of exposure and thereafter indicating to the operator the proper processing composition to be employed to process the exposed photosensitive material.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 is a diagrammatic elevational view, partially in section, of one form of camera embodying the present invention;

FIG. 2 is a sectional view taken along the line 2—2 of FIGURE 1;

Figure 3:
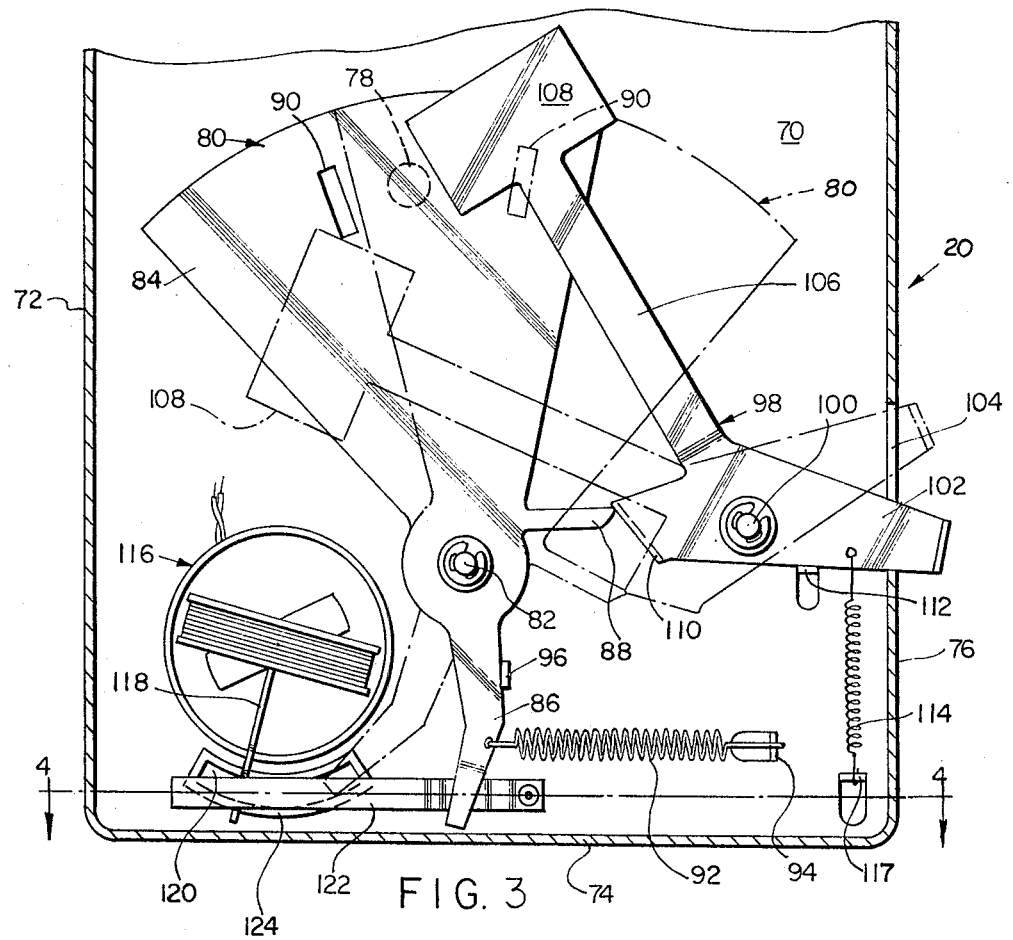
FIG. 3 is a fragmentary plan view illustrating a shutter assembly embodying the invention.

The camera of the invention comprises means for exposing a photosensitive sheet and thereafter treating the exposed photosensitive sheet with a fluid processing reagent in conjunction with a second sheet to produce a positive photographic print. The expression "second sheet" as used herein is intended to mean a second sheet which may merely cooperate with the photosensitive sheet to aid in the spreading of the processing fluid on the photosensitive sheet or, in a preferred form, provides a support for a positive print formed by diffusion transfer reversal. The photosensitive sheet may comprise a support and a layer of any of the light-sensitive materials known to the art and, in a preferred form, comprises a silver halide emulsion. The fluid processing composition is selected in accordance with the particular light-sensitive material which is employed and the type of processing intended and, in the preferred form wherein the photosensitive material is a silver halide emulsion and it is intended that a print be produced by silver halide diffusion transfer reversal on the second sheet, includes a silver halide developer and a silver halide solvent. The developer reduces exposed silver halide to silver and the solvent reacts with unreduced silver halide to form a soluble silver complex which is reduced in the presence of a silver precipitating environment to form a positive print, preferably on the second sheet. Further examples of processes of this type, together with materials useful therein, are described in detail in Patent No. 2,543,181, issued February 27, 1951, in the name of Edwin H. Land.

In conventional photographic methods and apparatus, the negative material is exposed and thereafter processed to produce a negative image and, in some instances, a positive print. Exposure is usually controlled so that it is suited for the rated speed (i.e., an expression of sensitivity) of the negative material whereby the negative image or print produced by a more or less standard process is useful and is of an optimum quality. The speed of the negative material is essentially fixed and optimum exposure is obtained by varying the exposure stop and/or the duration of exposure in accordance with the luminance conditions of the subject being photographed. The term "luminance", sometimes characterized as "brightness," is used herein to mean the absolute amount of light from a subject and is measured, usually, in candles per unit area or lamberts.

In my copending applications Serial Nos. 116,640 and 564,492 (now abandoned), there is described photographic processes whereby the equivalent overall speed of the process for producing a positive print by diffusion transfer reversal, which speed is based on the curve relating the original exposure of the negative to the density in the ultimate positive print, is unrelated to negative emulsion speed, it may be faster or slower, and is controlled by the fluid processing agent employed to produce the print. The apparatus of the present invention is particularly adapted for effecting the exposure and processing of photosensitive materials by the above method to produce positive prints wherein the equivalent overall speed of the process is controlled by the particular processing agent selected, which selection is made in accordance with the exposure. Thus, it is no longer necessary to vary exposure as is done in conventional photographic methods to suit the particular speed of the negative material, but exposure may be left to be determined by chance or existing conditions and the equivalent overall speed of the process is controlled so as to produce a useful and high quality positive print with the given exposure. Accordingly, the camera of the invention is provided with exposure means comprising a single stop and a shutter of a very simple and inexpensive design capable of providing a single speed, i.e., exposure duration. The camera, in addition to comprising single speed, single stop exposure means, also includes means for measuring subject luminance when the exposure is made and calculating the appropriate processing composition which will give an equivalent overall speed for which the exposure is proper.

It has been well established that, when taking pictures, best results can be achieved only when the photosensitive material being employed has a speed or sensitivity which is most nearly suited to the brightness of the subject being photographed, e.g., a relatively fast material should be employed for a dim subject matter, while a relatively slow photosensitive material is more suited for photographing a bright subject. In this respect the apparatus of the invention offers one advantage over cameras operating according to conventional photographic methods wherein the speed of the photosensitive material is fixed. In the method performed by the camera, the overall speed of the process, and, in effect, the speed of the photosensitive material, is always controlled so that it is most nearly the optimum for the luminance of the subject photographed and this is accomplished with a single photosensitive material. In conventional cameras and methods, on the other hand, optimum results rarely can be achieved even by controlling the stop size, exposure duration and development and printing processes when the speed of the emulsion is not suited to the luminance of the subject.

In my aforementioned copending applications Serial Nos. 116,640 and 564,492, there is given by way of example, formulations of processing solutions which, when used to process a silver halide emulsion, namely a gelatino iodobromide emulsion sold by Eastman Kodak under the name "Royal Pan," and having an ASA rated speed of approximately 370, gave rise to equivalent overall speeds ranging from 25 to 1000 reciprocal meter candle seconds (m.c.s.), and an example is given for a speed of substantially 3000 reciprocal m.c.s. In this manner a range of speeds suitable for practical use in the camera of the invention and differing from one another by a factor of two were obtained using a single emulsion of the "Royal Pan" type on a paper support. The formulation of processing solutions was adjusted to produce equivalent overall speeds ranging from 25 to 1000 with each speed being, nominally, twice the previous speed, with the same emulsion. This makes it possible for the exposure means of the camera to be very simple and inexpensive, comprising, for example, a pinhole aperture, instead of a lens and stop, and an inexpensive shutter required to do little more than commence and terminate exposures. Variations in the overall speed of the process to suit different exposures is achieved by providing a multiplicity of containers of fluid processing agents capable of producing a range of overall speeds suitable for predetermined exposures and selecting the proper fluid composition to be used which is most appropriate for each exposure.

The camera of the invention is shown, for purpose of illustration, constructed for exposing a frame of a photosensitive sheet and processing the exposed frame by superposing it with a second sheet and spreading a fluid composition in a layer between the sheets. The camera includes a housing providing a first chamber wherein a frame of the photosensitive sheet is positioned for exposure, a second chamber wherein the second sheet is positioned during exposure of the photosensitive sheet, and at least a third chamber which is isolated in a light-tight fashion from at least the first chamber. Means, in the form of a pair of pressure-applying members, are provided at one side of this third chamber for superposing the sheets and spreading a fluid composition therebetween as the sheets are withdrawn from the third chamber between the pressure-applying members.

The third chamber is so constructed and arranged that portions of the photosensitive and second sheets may be located therein with a fluid-receiving space between the sheets. Also associated with the third chamber are means whereby an elongated container, filled with a fluid processing composition, may be introduced into the camera into the fluid-receiving space between the sheets and then withdrawn in the direction of its elongation transversely of the sheets while the container is progressively compressed to effect the discharge of its fluid contents into the fluid-receiving space. The third chamber, being isolated from the first chamber, permits the introduction of a container into the fluid-receiving space between the sheets without exposing the exposure frame of the photosensitive sheet located in the first chamber. The construction of the third chamber is such that it may be sealed against the admission of light following withdrawal of the container, permitting the photosensitive and second sheets to be moved through the container between the pressure-applying members in a lighttight environment.

Only a portion of the photosensitive sheet located adjacent the exposure frame is positioned within the third chamber during introduction and withdrawal of a container and is subjected to exposure to light which may enter the chamber. The third chamber may also be isolated from the second chamber as well, although, in a preferred form, this is unnecessary since the second sheet is not sensitive to light and the second chamber for storing the second sheet is light-sealed from the first chamber. Also, it is possible to eliminate the second chamber entirely and store the second sheet in what is defined as the third chamber.

Cameras embodying the present invention, as illustrated in my aforementioned application Serial No. 116,640, may take a number of different forms for use with a variety of different types of photosensitive and second sheets and include cameras for use with photosensitive and second sheets in roll form with the photosensitive sheet comprising a series of exposure frames; photosensitive and second sheets in cut form, that is, as individual sheets with each photosensitive sheet including a single exposure frame and with the sheets either separate from one another or connected by leaders; and for use with a single exposure film assemblage comprising a photosensitive and second sheet secured together and adapted to be introduced into and withdrawn from the camera. The camera may be of the folding type, so-called box type or miniature type, and may be intended for use with photographic sheet materials having light-transmitting supports or backings or opaque backings.

Reference is now made to FIGS. 1 and 2 of the drawings wherein there is shown a camera embodying the invention and comprising a housing designated 10, having an upper wall 12, lower wall 14, side walls 16 and a rear wall 18. An exposure means comprising, for example, a lens and shutter assembly 20 is mounted on the forward portions of the upper, lower and side walls, all of which may converge toward the front of the housing. Rear wall 18 and lower wall 14 are disposed at oblique angles with respect to one another and form a passage 22 at their intersection through which a film assemblage may be introduced into the camera. Lower wall 14 and rear wall 18 are provided, respectively, with downwardly and rearwardly extending enlarged sections 24 and 26 located on opposite sides of passage 22.

A photographic assemblage 28 comprising a photosensitive sheet 30 and a second sheet 32 is adapted to be introduced through passage 22 into the camera wherein the sheets are positioned during exposure. The two sheets comprising photographic assemblage 28 are substantially coextensive with one another and are secured in face-to-face relation at least around their margins. Photosensitive sheet 30 includes a layer of photosensitive material on its inner surface comprising an exposure frame and the two sheets are opaque to actinic light so that the photosensitive material comprising the exposure frame is shielded from exposure when the two sheets are secured in superposition at least around the margins of said exposure frame. The portion of the second sheet superposed with the exposure frame must be separated therefrom in order to permit exposure of the photosensitive material.

As a means for positioning the photosensitive sheet for exposure within housing 10, side walls 16 are provided with grooves or tracks 34 located adjacent rear wall 18. The forward surface of rear wall 18 may be so located as to aid in properly positioning the photosensitive sheet for exposure. The camera includes an intermediate wall 36 located adjacent and generally parallel with lower wall 14 and cooperating with the latter to define a storage chamber 38 within which the second sheet is positioned apart from the photosensitive sheet during exposure of the latter. Intermediate wall 36 separates chamber 38 from the exposure chamber, designated 40, defined by the intermediate wall 36, upper wall 12, side walls 16 and rear wall 18.

Photographic assemblage 28 is adapted to be introduced into the camera with sheets 30 and 32 secured together in superposed relation, passage 22 being just wide enough for this purpose so that the sides of the passage engage the sheets and aid in preventing the admission of light through the passage. Accordingly, means are provided for separating the two sheets and guiding them into proper exposure positions, i.e., with sheet 30 retained in guide tracks 34 and sheet 32 located in storage chamber 38. In the form shown this last-mentioned means comprises a wedge-shaped portion 42 of intermediate wall 36 having a sharpened edge which extends into passage 22 in position to enter between the leading ends of the superposed sheets as they are introduced into the passage. The sheets, as they are moved through the passage, are spaced apart by wedge-shaped portion 42 and guided into their respective exposure positions.

Enlarged sections 24 and 26 of walls 14 and 18 are so formed as to provide a third and generally elliptically shaped chamber 44 located exterior of passage 22 and communicating therewith. The enlarged sections also include pressure-applying portions 46 having generally cylindrical surfaces defining a gap 48 of substantially fixed width in the side of chamber 44 opposite passage 22. The arrangement of gap 48 and passage 22 is such that an assemblage 28 can be introduced through gap 48, third chamber 44 and passage 22 without bending and with sheets 30 and 32 located in superposition. Gap 48 between pressure-applying portions 46 is of a substantially predetermined width greater than the thickness of the sheets comprising assemblage 28 whereby a fluid composition provided between the sheets is caused to be spread in a layer as the sheets are withdrawn from the camera through the gap. Pressure-applying portions 46 are shown as being somewhat enlarged so as to strengthen and add rigidity to the structure so that the width of the gap will remain substantially constant during spreading of the fluid, and may also be provided with suitable strengthening means for this purpose. As an alternate construction the pressure-applying means may comprise some type of device, for example a metal plate having a slot therethrough secured to enlarged sections 24 and 26 with the slot located in the position of gap 48 and serving the same purpose.

The structure of the camera as shown and described is such as to lend itself to formation from plastic materials, for example, by molding, with the result that the camera can be produced simply and inexpensively. The aforementioned strengthening means for the pressure-applying portions of the camera may take the form, for example, of rigid metal bars extending through the plastic material comprising portions 46 on opposite sides of the gap 48 and may, for example, be molded into the plastic material.

The fluid processing composition to be spread between the sheets is provided in an elongated tubular container, designated 50, of the type described in detail in my aforementioned Patent No. 3,047,387. Container 50 may be cylindrical, as shown, or oblate in cross section, and is formed of sheet material which is sufficiently rigid to resist deformation due to hydraulic pressure in its fluid contents, yet is flexible enough so that the container can be compressed or flattened by movement between a pair of pressure-applying members. The container is substantially longer than the transverse dimension of the sheets to be processed and includes a liquid-carrying cavity substantially equal in length to the width of the exposure frame. Both ends of the fluid-filled container are sealed closed with at least one of the ends being sealed so that it will open, for example, in response to hydraulic pressure generated in the fluid contents of the container. In the form shown in FIG. 2, the leading end of the container, designated 52, is sealed by compressing the wall of the container and securing or bonding the inner faces thereof to one another. A plug 54 having recessed flanges 64 is provided in the opposite or trailing end of the container for closing said end.

Container 50 is adapted to be introduced between the portions of sheets 30 and 32 located within third chamber 44 in a position transversely of the sheets. For this purpose the end walls of chamber 44, e.g., side walls 16, are provided with openings, designated 56 and 58, located opposite one another in the end of the chamber. Opening 56 is shaped to conform substantially to the shape of the container and plug so that the container may be introduced into chamber 44 therethrough. Opening 58 at the opposite end of chamber 44 is in the form of a narrow slot having dimensions just sufficient to admit the container in a flattened condition whereby the sides of the opening will engage the container and function as pressure-applying members for progressively compressing the container as it is withdrawn, in the direction of its leading end, through opening 58. The container is adapted to be introduced into chamber 44 between the sheets until the container is located, as shown in FIG. 2, with the leading end portion extending through opening 58 exteriorly of the camera, where it provides a leader by which the container may be grasped for withdrawing the container through the opening. A recess 60 is provided in the wall surrounding opening 56 together with a projecting lip 62 immediately surrounding the opening. Flange 64 of plug 54 is so formed as to extend around and engage lip 62 when the container is in the position shown, whereby a lighttight seal is formed between the plug and the end wall of chamber 44, and the plug is retained in covering relation to opening 56 when the container is withdrawn from the chamber through opening 58.

In order to permit introduction of the container between portions of sheets 30 and 32 located within chamber 44, these portions of the sheets must first be spaced apart from one another. This may be accomplished, in the form shown in FIG. 1, by continuing to push the sheets through gap 48 into chamber 44 after the sheets have been moved into exposure position and arrested whereby the portions of the sheets within chamber 44 are caused to bend or buckle apart from one another. The sheets in this region may be prefolded or creased to facilitate and insure buckling or bending in opposite directions at the desired locations, and are not secured to one another at their margins in this region.

As the container is withdrawn from between the portions of sheets 30 and 32 located within chamber 44, its trailing end is withdrawn from engagement with plug 54, thereby providing an open mouth through which the fluid contents of the container are discharged in the form of an elongated mass across the sheets as portions of the container succeeding from the leading end are compressed by the walls of opening 58. Generally the fluid should be quite viscous so that it can be readily controlled after being discharged, i.e., so that it will not flow freely of its own accord from the elongated mass which it first assumes when it is discharged from the container. It has been found that a fluid should have a viscosity ranging between 100 and 200,000 centipoises at a temperature of 20° C. if the fluid is to be spread readily from the elongated mass between the sheets.

Light-sealing means, for example, in the form of a sliding member 66 mounted on one of side walls 16 is provided for closing opening 58 following withdrawal of a container therefrom. Opening 56, as previously noted, is closed by plug 54 so that the only opening into chamber 44 from the exterior of the camera is gap 48 through which sheets 30 and 32 project and are adapted to be withdrawn. In an alternative form of the camera, suitable pressure-applying means may be provided in association with opening 58 for compressing the wall of the container as it is withdrawn from chamber 44 and this pressure-applying means may also act as a light-sealing element for closing the opening after the container has been withdrawn.

As the sheets are withdrawn through gap 48 from chamber 44, hydraulic pressure is generated within the fluid between the sheets, causing the fluid to be spread in a thin layer therebetween. Pressure-applying portions 46, of course, engage the surface of the sheets very closely so that substantially no light can enter chamber 44 and thereby expose other portions of the photosensitive sheet as they are drawn through the chamber. The layer of processing fluid, being quite viscous, causes the two sheets to remain adhered to one another as they are drawn from the camera; and, since the sheets are opaque, prevents exposure of the frame of the photosensitive sheet. To insure that light does not enter between the superposed sheets, a material, such as a light-opaque or light-absorbing pigment, may be provided in the processing fluid. At the end of a predetermined processing period, the photosensitive and second sheets may be stripped apart.

In another form, the container may be sealed at both ends in the same manner, that is, by compressing the walls together and either adhering them in this position or holding them together by suitable retaining means. This type of container comprises leading and trailing ends both formed by sealing or adhering the walls together, for example, by fusion of the material comprising the inner surfaces of the walls. To adapt it to use with this type of container, the camera includes a slot in one end of the processing chamber through which the container is withdrawn for compressing the container as it is moved through the slot and a suitable closure, similar to closure member 66, for closing the slot. An opening is provided in the opposite end of the processing chamber whereby the container may be introduced into the chamber between the sheets and a cap is provided for closing this opening against the admission of light into the processing chamber. The structure of each of containers 50 and the camera is such that the container is introduced into the third chamber through an opening in one end and is withdrawn in the same direction through an opening in the opposite end of the chamber. However, in another form of the camera, the third chamber may be provided with a single opening through which the container is both introduced and withdrawn, and the leading end of the container, that is, the end which is introduced first and withdrawn last, is sealed in such a manner that it will become unsealed in response to hydraulic pressure generated within the fluid contents of the container to provide an open mouth through which the fluid contents of the container are discharged. An opening is provided in one of the walls defining an end of chamber 44 through which the container is adapted to be introduced and moved into position with the leading end of the container located in a recess in the opposite end wall of the chamber. The recess is provided so that the fluid-filled cavity of the container will extend substantially to the edges of the sheets between which it is located. The trailing end of the container is substantially longer than the leading end and extends through the opening to provide a leader by which the container may be grasped for withdrawing it from the chamber; and a manually operable device is provided in association with the opening for applying compressive pressure to the container as it is withdrawn through the opening and for closing the opening against the admission of actinic light after the container has been withdrawn.

Figure 4:
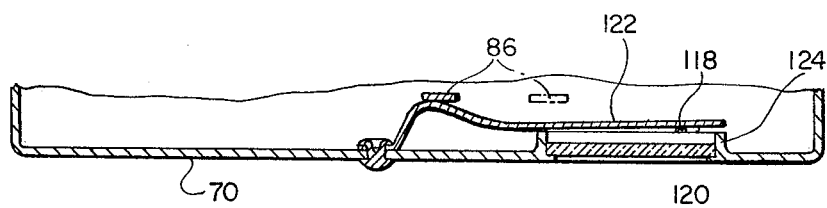
FIG. 4 is a fragmentary sectional view taken substantially along the line 4—4 of FIG. 3.

The shutter 20 of the invention, shown in FIGS. 3 and 4, is quite simple in construction and is of the blade and cover-blind type, comprising a housing including a forward wall 70, a rear wall (not shown) and side walls 72, 74 and 76. Forward wall 70 is provided with an exposure aperture 78 for transmitting light through the shutter assembly and with which a conventional lens may be associated. The mechanism for covering and uncovering aperture 78 includes a blade 80 pivotally mounted on a stud 82 and having a sector-shaped section 84 movable in covering relation to aperture 78 and a first arm 86, blade 80 being pivotally mounted intermediate sector-shaped section 84 and arm 86. Blade 80 also includes a second arm 88 and is formed with an exposure opening 90 in the form of a slot positioned in sector-shaped section 84 for movement across aperture 78. Blade 80 is normally located in a rest position, shown in solid lines in FIG. 3, with opening 90 located to one side (the left) of aperture 78 and sector-shaped section 84 obscuring the aperture. A spring 92 coupled between arm 86 and a lug 94, turned up from forward wall 70, is provided for biasing blade 80 into the rest position shown. A stop 96 may be provided on forward wall 70 for engaging arm 86 in the rest position and preventing substantial motion of the blade under the bias of spring 92 beyond the rest position shown.

The shutter mechanism is of the self-cocking type in which a lever is moved for both cocking or setting the shutter and releasing the shutter to make an exposure. During the cocking motion, blade 80 is pivoted against the bias of spring 92 from the rest position in a clockwise direction to the cocked position, shown in broken lines, moving exposure opening 90 across aperture 78 from the left to right. An exposure of predetermined duration is made by releasing the cocked shutter blade for movement under the bias of spring 92 in a counter-clockwise direction so that opening 90 moves across aperture 78 from right to left. An operating lever is provided for moving the shutter blade into cocked position releasing the shutter blade to make an exposure and includes a cover blind for covering aperture 78 as opening 90 moves across the aperture during cocking or setting of the shutter. This operating lever, designated 98, is in the form of a crank pivotally mounted on a stud 100 and including a first arm 102 extending through a slot 104 in side wall 76 to provide manually engageable means for actuating the shutter; a second arm 106 having an enlarged end section 108 which is pivotable across aperture 78 and functions as a cover blind for closing the aperture during cocking movement of the shutter blade, and a third arm 110 for engaging arm 88 of the shutter blade to pivot the shutter blade into set position and then release the blade for movement to make an exposure. Lever 98 is pivotable from the rest position, shown in solid lines, where it is retained against a stop 112 by a spring 114 coupled between first arm 102 and a lug 117 turned up from forward wall 70, in a counterclockwise direction to a release position, shown in broken lines. The end of third arm 110 is turned down so as to engage arm 88 and during the initial portion of the counterclockwise rotation of lever 98, third arm 110 engages arm 88 pivoting blade 80 in a clockwise direction into cocked position. During pivotal movement of opening 90 across exposure aperture 78, end section 108 of second arm 106 passes across the exposure aperture obscuring the aperture and preventing admission of light during movement of opening 90 across the exposure aperture.

Continued pivotal movement of crank 98 past the cocked position, causes third arm 110 to become disengaged from arm 88 allowing blade 80 to pivot under the bias of spring 92 from its set to its rest position making an exposure. In the set position of crank 98, end portion 108 is located to the left of aperture 78 and remains there during exposure until crank 98 is released to return to its rest position under the bias of spring 114. As crank 98 returns to its rest position, it moves past the end of arm 88 deflecting the arm slightly and thence into position for engaging the arm so as to pivot the blade into cocked position when crank 98 is again actuated.

The shutter mechanism also includes a photoresponsive device for measuring the scene or subject luminance substantially at the moment of exposure and indicating either the luminance of the subject or the container of processing liquid appropriate for the exposure made. These photoresponsive means include a photoresponsive transducer, i.e., a conventional photoconductive or photovoltaic cell (not shown), positioned in the shutter housing for receiving light from the subject, coupled with means such as a galvanometer 116 or other current-measuring device, for giving an indication of the light incident on the photocell. Galvanometer 116 includes an indicating needle 18 visible from the outside of the shutter housing through a window 120. The outside of the camera housing in the vicinity of the window is preferably provided with suitable indicia representing exposures and/or containers of processing liquid, and the galvanometer and photocell are calibrated so that the needle indicates proper exposures and/or containers of processing liquid.

In the operation of the shutter mechanism, the operator aims the camera and actuates the shutter to make an exposure and thereafter, by observing the position of needle 118 visible through window 120, learns the exposure, which is the function of the size of aperture 78, the size of exposure opening 90 and speed of movement of the opening across aperture 78, all of which are fixed, and the subject luminance which, of course, is variable. In order for an accurate determination of the exposure, the subject luminance must be measured at the instant the exposure is made and, for this purpose, the shutter mechanism includes means for clamping needle 118 substantially at the moment of exposure and retaining the needle in this position until the next exposure is made. This clamping means includes a leaf spring 122 mounted on forward wall 70 and extending adjacent the path of pivotal movement of needle 118 and deformable toward and away from the needle to clamp the needle against a frame 124 surrounding window 120. Spring 122 is biased away from the needle so that the needle is normally free to move and is deformable into clamping engagement with the needle by the free end portion of arm 86 of shutter blade 80. Spring 122 and arm 86 are so constructed and positioned that the arm, in the rest position of the shutter blade, engages spring 122 and deforms it against needle 118, clamping the needle between the spring and frame 124 and retaining the needle in fixed position; and during the initial portion of the setting movement of the shutter blade, arm 86 moves out of engagement with spring 122 releasing needle 118 for movement into a position dependent upon the brightness of the light from the subject incident upon the photocell. During the latter portion of the exposure movement of blade 80, and within a minute fraction of a second of the passage of opening 90 across aperture 78, arm 86 engages spring 122, effectively clamping the needle at the moment of exposure, where the needle is retained so that the operator can observe the position of the needle at his convenience any time prior to the next exposure, at which time the needle is again released for movement.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A camera for exposing and processing photosensitive sheet material to produce photographic prints comprising, in combination:
   a housing for holding said photosensitive sheet material during exposure and processing;
   means for introducing a container of processing liquid into said housing;
   means for dispensing said processing liquid from said container and distributing said liquid in contact with an exposed area of said photosensitive sheet material;
   exposure means including a substantially constant aperture for exposing successive areas of said photosensitive sheet material to light from a subject for a substantially fixed time interval;
   light-sensitive means for measuring the light from said subject incident upon said light-sensitive means; and
   visible indicator means coupled with said light-sensitive means and movable in response thereto for indicating the container of processing liquid appropriate for the luminance conditions of said subject, said exposure means including means coupled with said indicator means for engaging and retaining said indicator means against movement substantially at the moment of exposure.

2. The camera of claim 1 in which said exposure means comprise a single speed shutter.

3. The camera of claim 1 in which said light-sensitive means comprise a photoelectric transducer; said indicator means comprise a galvanometer coupled with said transducer for actuation thereby and having a visible indicator; and said exposure means include means for engaging and restraining said indicator against motion.

4. The camera of claim 3 in which the last-mentioned means include a clamping member movable into engagement with said indicator, and said exposure means include an exposure member movable across said aperture from a set position to a rest position during exposure and, in said rest position, coacting with said clamping member to urge the latter into engagement with said indicator.

5. The camera of claim 4 in which said exposure member is moved from said rest to said set position in order to make an exposure and, during movement to said set position, is disengaged from said clamping member causing the latter to release said indicator.

6. In a camera comprising a housing for holding photosensitive sheet material during exposure and processing, means for introducing a container of processing liquid into said housing, and means for dispensing said processing liquid from said container and distributing said liquid in contact with an exposed area of said photosensitive sheet material to produce a photographic print, in combination:

exposure means for making exposures of substantially constant duration with the same aperture; and light-responsive means coupled with said exposure means for measuring of the luminance conditions of the subject at the moment of exposure and thereafter indicating to the operator the processing liquid appropriate for treating the photosensitive material thus exposed.

7. The camera of claim 6 in which said light-sensitive means include a visible moving indicator and clamping means for engaging and retaining said indicator against movement; and said exposure means include a member movable from a first position to a second position during exposure and coacting with said clamping means in said second position to cause the latter to restrain said indicator against movement.

References Cited by the Examiner
UNITED STATES PATENTS 3,090,290   5/1963   Ross _____ 95—89

JOHN M. HORAN, *Primary Examiner.*